United States Patent
Hyun et al.

(10) Patent No.: US 8,457,472 B2
(45) Date of Patent: Jun. 4, 2013

(54) METHOD AND APPARATUS FOR SEGMENTING RECORDED NEWS PROGRAM ACCORDING TO TOPICS

(75) Inventors: Dongjoon Hyun, Suwon-si (KR); Yoonhee Choi, Suwon-si (KR); Heeseon Park, Seoul (KR); Hochul Shin, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 776 days.

(21) Appl. No.: 12/363,994

(22) Filed: Feb. 2, 2009

(65) Prior Publication Data

US 2009/0263098 A1    Oct. 22, 2009

(30) Foreign Application Priority Data

Apr. 22, 2008    (KR) .................. 10-2008-0037319

(51) Int. Cl.
*H04N 9/80*    (2006.01)
(52) U.S. Cl.
USPC ........................................................ 386/241
(58) Field of Classification Search
USPC ........................................... 386/200, 241, 297
See application file for complete search history.

(56) References Cited

U.S. PATENT DOCUMENTS

| | | | |
|---|---|---|---|
| 2006/0031916 A1* | 2/2006 | Colter et al. | 725/135 |
| 2006/0215991 A1* | 9/2006 | Larson et al. | 386/83 |
| 2007/0204319 A1* | 8/2007 | Ahmad et al. | 725/134 |
| 2008/0134258 A1* | 6/2008 | Goose et al. | 725/91 |
| 2009/0119335 A1* | 5/2009 | Ide et al. | 707/104.1 |

* cited by examiner

*Primary Examiner* — Huy T Nguyen
(74) *Attorney, Agent, or Firm* — Sughrue Mion, PLLC

(57) ABSTRACT

Provided are a method and apparatus for segmenting a recorded news program according to topics. The method and apparatus compare web bulletins, segmented according to topics and posted, with moving pictures and/or captions of the recorded news program, and correct or generate captions of the recorded news program by referring to text included in the web bulletins, thereby enabling accurate segmentation of the recorded news program according to topics and correction of errors in the captions.

13 Claims, 4 Drawing Sheets

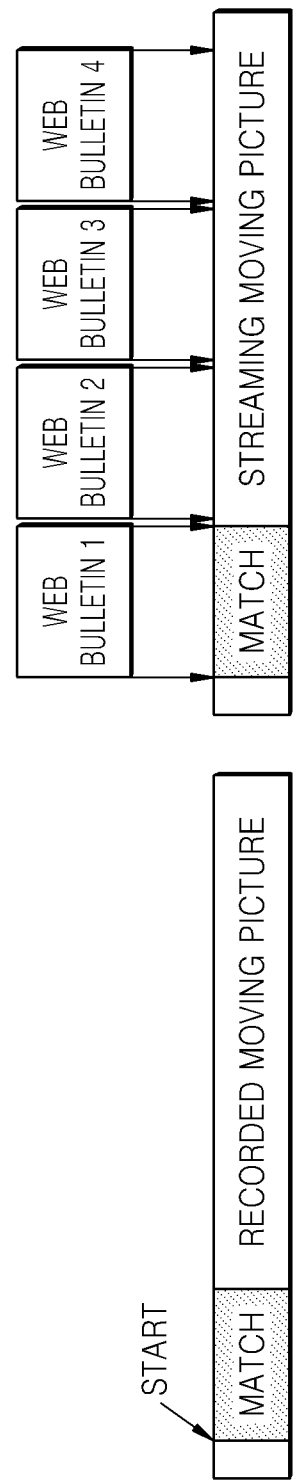

METHOD AND APPARATUS FOR SEGMENTING RECORDED NEWS PROGRAM ACCORDING TO TOPICS

CROSS-REFERENCE TO RELATED PATENT APPLICATION

This application claims the benefit of Korean Patent Application No. 10-2008-0037319, filed on Apr. 22, 2008, in the Korean Intellectual Property Office, the disclosure of which is incorporated herein in its entirety by reference.

BACKGROUND OF THE INVENTION

1. Field of the Invention

Methods and apparatuses consistent with the present invention relate to a digital broadcasting program, and more particularly, to a method and apparatus for segmenting a recorded news program according to topics.

2. Description of the Related Art

Recently, electronic devices such as a digital televisions (TVs) or personal video recorders (PVRs) having large storage capacities have been introduced so that users can easily record a broadcasting program via a digital broadcasting channel and can conveniently reproduce and watch the broadcasting program at a desired time.

However, in the case of a news program, a plurality of articles are generally included in one news program. Thus, even though a user has recorded a news program, the user has to inconveniently search for a desired topic in the recorded news program by executing a fast forward function.

In order to solve such inconveniences, research has been conducted, aiming to divide a recorded news program into segments by analyzing a caption, voice, an image, and the like. However, the research depending on the analysis of the caption, the voice, and the image has problems in that a border of a research field is ambiguous, related technologies are complicated, and accuracy deteriorates.

For example, accuracy of a segmentation method according to voice analysis, or according to image analysis particularly deteriorates when more than two announcers or reporters report a same topic. Also, a segmentation method according to caption analysis analyzes words included in a caption, and detects an issue change, thereby forming segments. However, not every news program provides the caption, and moreover, since the caption is typed in real-time by a shorthand writer who listens to voice from the news program, thus, there may be many typographic errors. Hence, accuracy of the segmentation method corresponding to such a caption is also very low.

SUMMARY OF THE INVENTION

Exemplary embodiments of the present invention provides a method and apparatus which correctly segment a recorded news program according to topics and which aim to enhance correctness of a caption for each topic.

According to an aspect of the present invention, there is provided a method of segmenting a recorded news program according to topics, the method including the operations of searching for a web bulletin corresponding to at least one topic from among topics of the recorded news program; and detecting a section corresponding to the at least one topic in the recorded news program by referring to the web bulletin.

The operation of detecting may include the operations of comparing the recorded news program with a moving picture comprised in the web bulletin, and detecting a part which corresponds to the moving picture comprised in the web bulletin and which is from the recorded news program.

The operation of detecting may include the operations of comparing captions comprised in the recorded news program with text comprised in the web bulletin, and detecting a part which corresponds to the text comprised in the web bulletin and which is from among the captions comprised in the recorded news program.

The method may further include the operation of generating a caption for a part corresponding to the at least one topic in the recorded news program, or correcting an existing caption, by using the text comprised in the web bulletin.

The operation of detecting may include the operation of detecting the section corresponding to the at least one topic in the recorded news program by using a start point of the recorded news program and offset information comprised in the web bulletin.

The operation of searching for the web bulletin may include the operation of using at least one of a broadcasting station, a program title, a broadcasting date, and a broadcasting time by referring to electronic program guide (EPG) information.

According to another aspect of the present invention, there is provided a computer readable recording medium having recorded thereon a computer program for executing the method.

According to another aspect of the present invention, there is provided an apparatus for segmenting a recorded news program according to topics, the apparatus including a web search unit searching for a web bulletin corresponding to at least one topic from among topics of the recorded news program; and a detection unit detecting a section corresponding to the at least one topic in the recorded news program by referring to the web bulletin.

BRIEF DESCRIPTION OF THE DRAWINGS

The above and other features and aspects of the present invention will become more apparent by describing in detail exemplary embodiments thereof with reference to the attached drawings in which:

FIG. 4 is a diagram for illustrating a method of segmenting a news program according to topics by using offset information provided from web bulletins according to another embodiment of the present invention.

DETAILED DESCRIPTION OF THE INVENTION

Exemplary embodiments of the present invention will now be described more fully with reference to the accompanying drawings, in which exemplary embodiments of the invention are shown.

Figure 1:
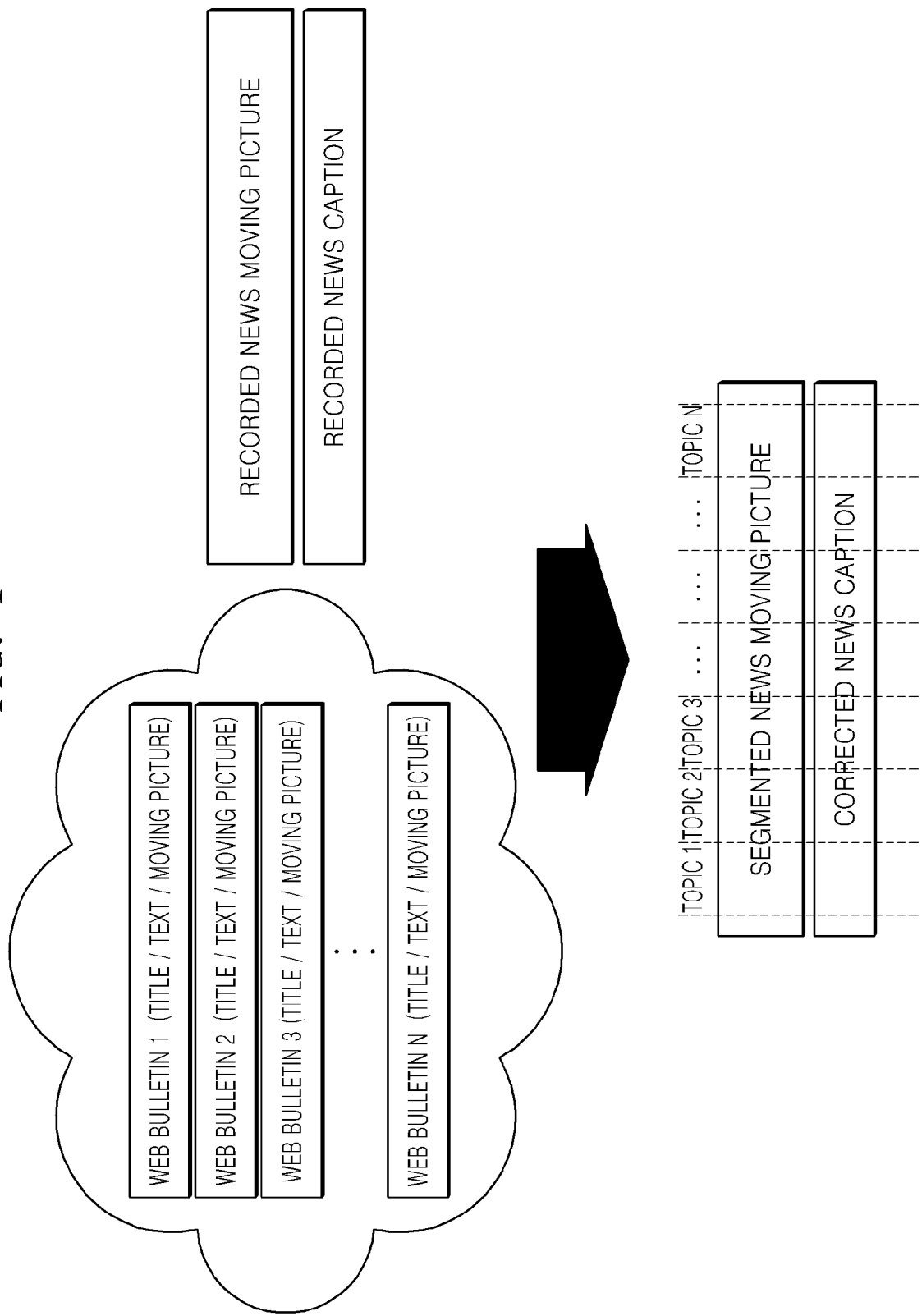
FIG. 1 is a diagram for illustrating a concept of a method of segmenting topics, according to an embodiment of the present invention.

FIG. 1 is a diagram for illustrating a concept of a method of segmenting topics, according to an embodiment of the present invention.

Here, it is assumed that a broadcasting station or a news provider posts each of a plurality of topics in a news program via a website. Actually, in almost every homepage of broadcasting stations, each topic of news programs is posted according to a timetable.

Such a posting after segmenting a news program is manually performed by staff in the broadcasting stations so that the segmentation is accurate. The present invention is designed based on such a manual segmentation method, and aims to segment a recorded news program according to topics by using web bulletins.

Meanwhile, such web bulletins generally provide a news program title, an article title, a broadcasting date and time, a moving picture, and text. Here, the text is a news program script to be read by an announcer or a reporter, and may be used for correction of caption errors.

As illustrated in FIG. 1, topics included in a news program are posted on a website soon after the corresponding news program is broadcasted (generally within 2-3 hours). Such topics, i.e., web topics, are indicated as a web bulletin 1, a web bulletin 2, through a web bulletin N, and as described above, a title, text, a moving picture, and the like may be included in each web bulletin.

Meanwhile, a news program recorded by a user using a personal video recorder (PVR) or the like includes not only moving picture but also a caption for hearing-impaired persons.

As illustrated in FIG. 1, the present invention segments a recorded news program according to topics by using web bulletins manually segmented and posted by a person, and also corrects or newly generates a news caption by using text included in the web bulletins.

Figure 2:
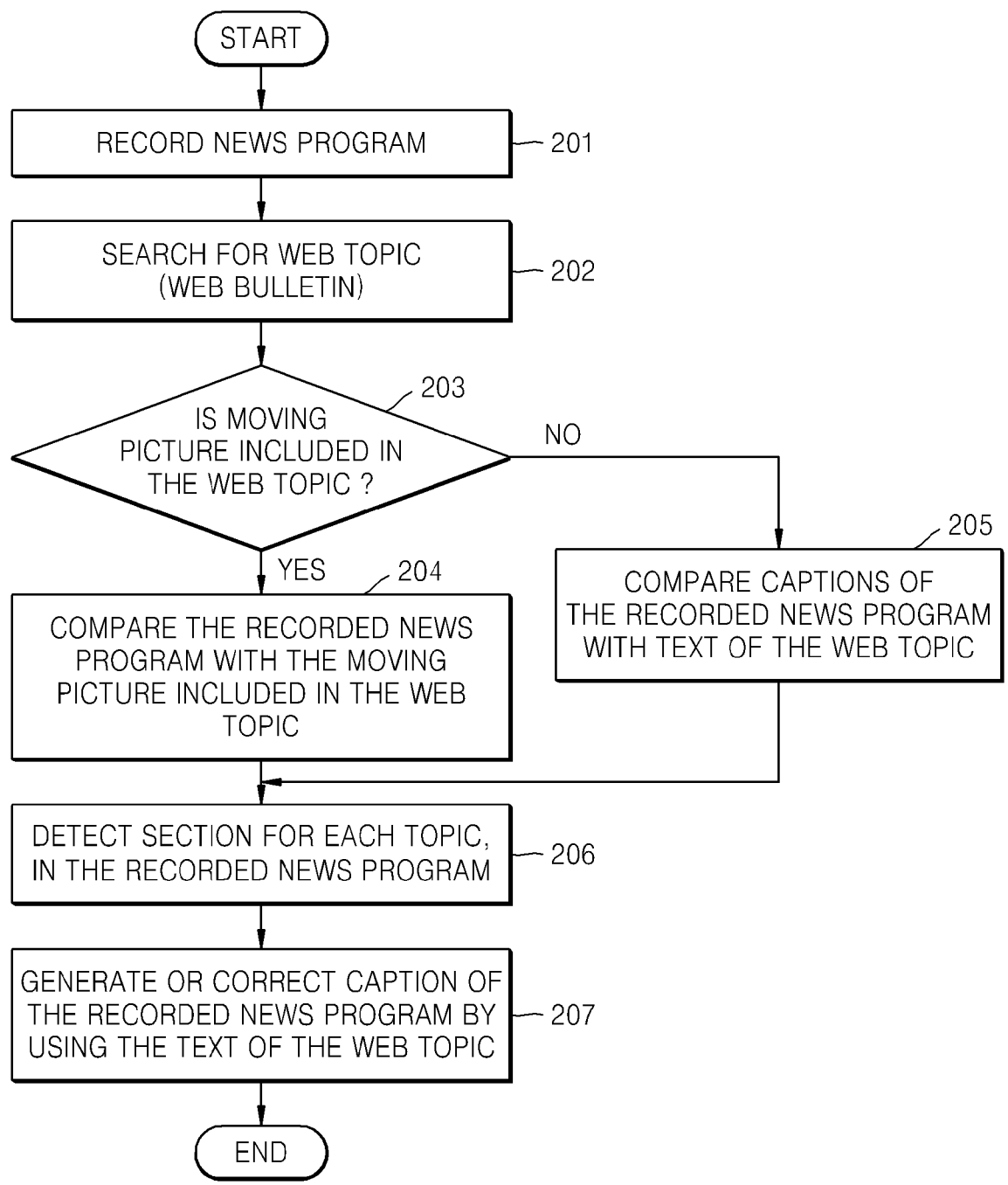
FIG. 2 is a flowchart of a method of segmenting a news program according to topics, according to another embodiment of the present invention.

FIG. 2 is a flowchart of a method of segmenting a news program according to topics, according to another embodiment of the present invention.

In operation 201, a user records a news program by using a digital television (TV) or a PVR.

In operation 202, a web bulletin for each of a plurality of topics included in the recorded news program is searched for. That is, in the current embodiment, it is assumed that the web bulletin for each of the topics is posted on a website by a news program provider.

In order to search for the web bulletin, electronic program guide (EPG) information may be referred to. That is, by referring to information about a news program title, a broadcasting date and time, a broadcasting station, and the like, which are included in the EPG information, Uniform Resource Locators (URL) of a corresponding web-page may be searched for.

In operation 203, whether a moving picture is included in the corresponding web bulletin is determined. In general, a web bulletin includes a moving picture but the web bulletin may only provide text.

In operation 204, when the web bulletin includes the moving picture, the moving picture of the web bulletin is compared with a moving picture of the recorded news program. For this, conventional image analysis and conventional voice analysis may be used.

Also, in the case where the corresponding web-page provides offset information, the recorded news program may be conveniently segmented according to topics even though moving pictures for each of the topics are not individually compared with the recorded news program. A detailed explanation thereof will be described later with reference to FIG. 4.

In operation 205, when the web bulletin does not include the moving picture, captions of the recorded news program are compared with text included in the web bulletin. Since the captions of the recorded news program are synchronized with the news program with respect to a reproduction time, a corresponding topic may be detected from the recorded news program by detecting a part of the captions from among the captions and which is matched with the text included in the web bulletin.

In operation 206, a section corresponding to each topic in the recorded news program is detected. Such section detection may be a procedure of detecting a start time and/or an end time of each topic.

In operation 207, the captions of the recorded news program are corrected or newly generated using the text of the web bulletin. As described above, since the captions of the news program are typed in real-time by a shorthand writer who listens to voice from the news program, there may be typographic errors. On the other hand, the text of the web bulletin is the same as a script of the news program so that the captions of the recorded news program may be corrected by using the text of the web bulletin.

Also, in the case where the captions are not included in all or some segments of the recorded news program, a caption for a corresponding topic may be generated using a text of a web bulletin.

In this manner, the present invention may segment the recorded news program by using the web bulletin that is segmented according to topics and posted directly by a person, and may also obtain a correct caption by using the text of the web bulletin.

Figure 3:
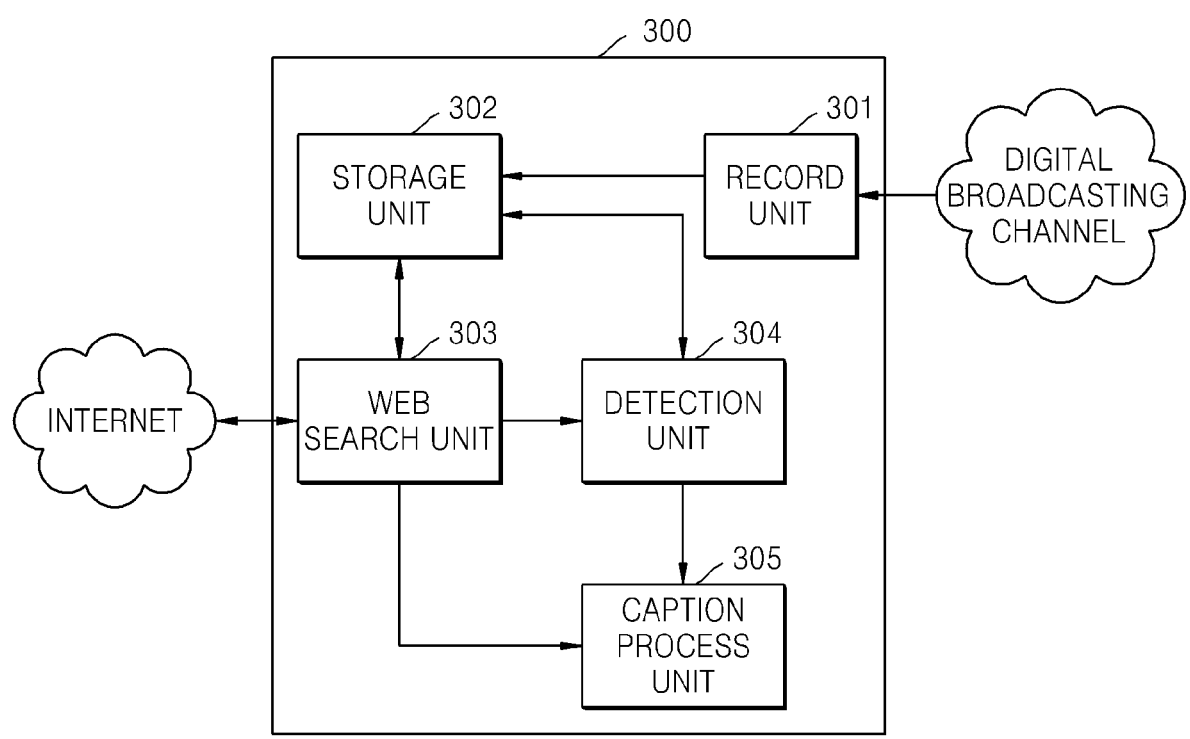
FIG. 3 is a diagram of a structure of an apparatus for segmenting a news program according to topics, according to an embodiment of the present invention.

FIG. 3 is a diagram of a structure of an apparatus 300 for segmenting a news program according to topics, according to an embodiment of the present invention.

As illustrated in FIG. 3, the apparatus 300 according to the current embodiment of the present invention includes a record unit 301, a storage unit 302, a web search unit 303, a detection unit 304, and a caption process unit 305.

The record unit 301 stores broadcasting data of a news program received via a digital broadcasting channel, in the storage unit 302.

The web search unit 303 searches for web bulletins corresponding to topics of the news program stored in the storage 302, via the Internet. At this time, at least one piece of information about a broadcasting station, a program title, a broadcasting date, and a broadcasting time, which are included in EPG information, may be referred to.

The detection unit 304 refers to the web bulletins searched for by the web search unit 303, and segments the news program stored in the storage 302 according to topics. That is, the detection unit 304 detects a section for each of the topics included in the news program.

For this, the detection unit 304 compares moving pictures included in the news program with moving pictures included in the web bulletins, or compares captions included in the news program with text included in the web bulletins. Also, in the case where the web bulletins provide offset information, the detection unit 304 may easily search for a start point and/or an end point of the topics in the news program by using a start point of the news program and the offset information, without performing moving picture analysis or text analysis.

When the section for each of the topics is detected by the detection unit 304, the caption process unit 305 corrects errors in the captions of the news program by referring to the texts of the web bulletins. Also, in the case where the news program does not include the captions, the caption process unit 305 generates a caption of the news program by using the texts of the web bulletins.

FIG. 4 is a diagram for illustrating a method of segmenting a news program according to topics by using offset information provided from web bulletins according to another embodiment of the present invention.

The offset information may be provided from the web bulletins. However, web bulletins may not be provided for each topic, but instead, one whole streaming moving picture may be provided as a web bulletin and an offset may be provided for each of a plurality of topics included in the one whole streaming moving picture.

In this case, as illustrated in FIG. 4, a first topic of the one whole streaming moving picture is compared with the news program so that a start point of a recorded news program is searched for. The start point of the recorded news program is a position corresponding to a start point of the first topic in the one whole streaming moving picture. After that, by using offset information about each topic, a start point and/or an end point of each topic in the recorded news program may be searched for. That is, a start point of a corresponding topic is a position which is separated from the start point of the first topic by as much as an offset, and thus, the news program may be easily segmented according to topics even though moving picture analysis or text analysis is not performed.

According to the present invention, the recorded news program can be accurately segmented according to topics, captions can be generated for the news program that does not include captions, and errors existing in the captions of the news program can be corrected.

The embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), and optical recording media (e.g., CD-ROMs, or DVDs). In other exemplary embodiments, the computer readable recording medium may include storage media such as carrier waves (e.g., transmission through the Internet).

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of segmenting a recorded news program according to topics, performed by an apparatus including a web search unit and a detection unit, the method comprising:
    searching, by the web search unit, for a web bulletin corresponding to a topic from among topics of the recorded news program, wherein the web bulletin corresponding to the topic from among the topics of the recorded news program is posted on a website by a news program provider; and
    automatically detecting, by the detection unit, a section corresponding to the topic, in the recorded news program by referring to the web bulletin.

2. The method of claim 1, wherein the detecting comprises comparing the recorded news program with a moving picture in the web bulletin, and detecting the section based on the comparing.

3. The method of claim 1, wherein the detecting comprises comparing captions in the recorded news program with text in the web bulletin, and detecting the section based on the comparing.

4. The method of claim 1, further comprising generating, by a caption process unit, a caption for the section corresponding to the topic in the recorded news program, or correcting an existing caption, by using a text in the web bulletin.

5. The method of claim 1, wherein the detecting comprises detecting the section corresponding to the topic in the recorded news program by using a start point of the recorded news program and offset information in the web bulletin.

6. The method of claim 1, wherein the searching for the web bulletin comprises using at least one of a broadcasting station, a program title, a broadcasting date, and a broadcasting time by referring to Electronic Program Guide (EPG) information.

7. A non-transitory computer readable recording medium having recorded thereon a computer program for executing the method of claim 1.

8. An apparatus for segmenting a recorded news program according to topics, the apparatus comprising:
    a web search unit which searches for a web bulletin corresponding to a topic from among topics of the recorded news program, wherein the web bulletin corresponding to the topic from among the topics of the recorded news program is posted on a website by a news program provider; and
    a detection unit which automatically detects a section corresponding to the topic, in the recorded news program by referring to the web bulletin.

9. The apparatus of claim 8, wherein the detection unit compares the recorded news program with a moving picture in the web bulletin in a comparison, and detects the section based on the comparison.

10. The apparatus of claim 8, wherein the detection unit compares captions in the recorded news program with text in the web bulletin in a comparison, and detects the section based on the comparison.

11. The apparatus of claim 8, further comprising a caption process unit which generates a caption for the section corresponding to the topic in the recorded news program, or which corrects an existing caption, by using the text in the web bulletin.

12. The apparatus of claim 8; wherein the detection unit detects the section corresponding to the topic in the recorded news program by using a start point of the recorded news program and offset information in the web bulletin.

13. The apparatus of claim 8, wherein the web search unit searches by referring to at least one of a broadcasting station, a program title, a broadcasting date, and a broadcasting time included in Electronic Program Guide (EPG) information.

* * * * *